United States Patent [19]
Miller et al.

[11] Patent Number: 5,818,744
[45] Date of Patent: Oct. 6, 1998

[54] CIRCUIT AND METHOD FOR DETERMINING MULTIPLICATIVE INVERSES WITH A LOOK-UP TABLE

[75] Inventors: Roger L. Miller, San Jose; Thomas P. Harper, Sunnyvale, both of Calif.

[73] Assignee: National Semiconductor Corp., Santa Clara County, Calif.

[21] Appl. No.: 191,564

[22] Filed: Feb. 2, 1994

[51] Int. Cl.⁶ .................................................. G06F 7/52
[52] U.S. Cl. .......................................................... 364/765
[58] Field of Search ................................... 364/765, 761

[56] References Cited

U.S. PATENT DOCUMENTS

| | | | |
|---|---|---|---|
| 3,859,512 | 1/1975 | Ritzinger | 364/484 X |
| 4,823,301 | 4/1989 | Knierim | 364/765 |
| 4,917,443 | 4/1990 | Kramer et al. | |
| 4,991,132 | 2/1991 | Kadota | 364/765 |
| 5,012,438 | 4/1991 | Yamaguchi | 364/765 |
| 5,176,429 | 1/1993 | Junichi et al. | |
| 5,193,886 | 3/1993 | Gloceri | |
| 5,193,887 | 3/1993 | Bleckman et al. | |

*Primary Examiner*—Tan V. Mai
*Attorney, Agent, or Firm*—Skjerven, Morrill, MacPherson, Franklin & Friel; David E. Steuber; David T. Millers

[57] ABSTRACT

Digital circuits determine multiplicative inverses using look-up tables which, in response to an address signal, provide a signal indicating a multiplicative inverse. The look-up tables store values indicating inverses for numbers between 1 and 2. The circuit factors a value to be inverted as product a power of two and a factor between 1 and 2. An address signal indicating the factor is applied to the look-up table, and the look-up table provides a signal which indicates the inverse of the factor. The signal provided by the look-up table is then converted to the proper scale for the exponent N. Factoring and conversion may be accomplished with logical shifts so that no multiplier is required. The look-up table may be compressed by not storing bits of inverses, which are constant or only change once within the range of the look-up table and by only storing look-up values for every other number within the range of the look-up table. A code bit in each look-up table value permits generation of correct inverses for values not stored.

19 Claims, 2 Drawing Sheets

CIRCUIT AND METHOD FOR DETERMINING MULTIPLICATIVE INVERSES WITH A LOOK-UP TABLE

CROSS-REFERENCES TO RELATED APPLICATIONS

This application is related to and incorporates by reference U.S. patent application Ser. No. 08/191,832 by Roger L. Miller entitled "DISASTER AVOIDANCE CLOCK FOR ANTI-LOCK BRAKING SYSTEM", U.S. patent application Ser. No. 08/190,812 by Roger L. Miller and Timothy T. Regan entitled "FAILSAFE VOLTAGE REGULATOR WITH WARNING SIGNAL DRIVER", and U.S. patent application Ser. No. 08/910,811 by Roger L. Miller and Thomas P. Harper entitled "ANTI-LOCK BRAKING SYSTEM"; all filed on the same date and assigned to the same assignee as the present application.

FIELD OF THE INVENTION

This invention relates to use of a look-up table in place of a divider in a digital circuit, and in particular to use of a look-up table to determine a velocity in a low cost anti-lock braking system.

BACKGROUND INFORMATION

In many digital systems it is necessary to perform divisions where either the dividend or divisor is a fixed quantity. For example, some heart rate monitors measure a time T between two heart beats and determine a heart rate which is the multiplicative inverse $1/T$ or $T^{-1}$ of the time. Another example digital system is an anti-lock braking system which uses a velocity $(d/\Delta T)$ which may be determined from a fixed distance d traveled in a measured time $\Delta T$. Because the distance d is fixed, the multiplicative inverse $\Delta T^{-1}$ of the time $\Delta T$ is proportional to the velocity, and anti-lock braking systems may calculate and use the multiplicative inverse $\Delta T^{-1}$ in place of the velocity.

Prior art digital systems typically determine multiplicative inverses by dividing, using a math block with a hardware divider. Hardware dividers are fast enough for most applications including anti-lock braking system but are expensive because hardware dividers require a large area in an integrated circuit. Other systems use software divide techniques instead of hardware. However, software divides can be too slow for some anti-lock braking system applications. To speed up a software divide, two or more processors working in parallel can be employed, but using more than one processor increases system cost. Accordingly, fast and inexpensive circuits are needed for dividing.

SUMMARY OF THE INVENTION

In accordance with the present invention, a digital circuit divides a constant dividend by a variable divisor using a look-up table which, in response to an address signal depending on the divisor, provides a signal indicating the quotient.

In one embodiment, the dividend has a fixed value of one, and the look-up table stores values indicating multiplicative inverses of a predetermined range of divisors. In operation, the circuit factors the divisor as a product of a power of two ($2^N$) and a factor within the predetermined range of divisors. An address signal indicating the factor is applied, and the look-up table provides a signal which indicates the inverse of the factor. The signal from the look-up table is then converted to the proper scale using the exponent N. The factoring and converting can be accomplished using either logical shifts or addition so that no multiply (or divide) is required.

In one embodiment of the invention, a value to be inverted is factored by storing an integer representation of the value to be inverted in a register then shifting the value in the register left until the most significant non-zero bit of the integer representation is shifted into a carry bit of the register. The shifted value in the register indicates a factor between one and two, (the carry bit representing one and the remaining bits in the register representing a fraction added to one). The number of shifts indicates a power of two which when multiplied by the factor, provides the value to be inverted. The look-up table stores values corresponding to inverses of values between one and two. An inverse value corresponding to the factor is read from the look-up table and shifted to the proper scale as indicated by the number of shifts.

In another embodiment, the entries in the look-up table are compressed to reduce the amount of data stored. Most significant bits which are constant or only change once for all values in the look-up table are not stored but are appended during conversion. The look-up table can be further compressed by only storing values for every other value within the range of the look-up table and incorporating into the stored values a code bit which indicates how to generate values that were not stored in the look-up table.

DETAILED DESCRIPTION OF THE PREFERRED EMBODIMENTS

Figure 1:
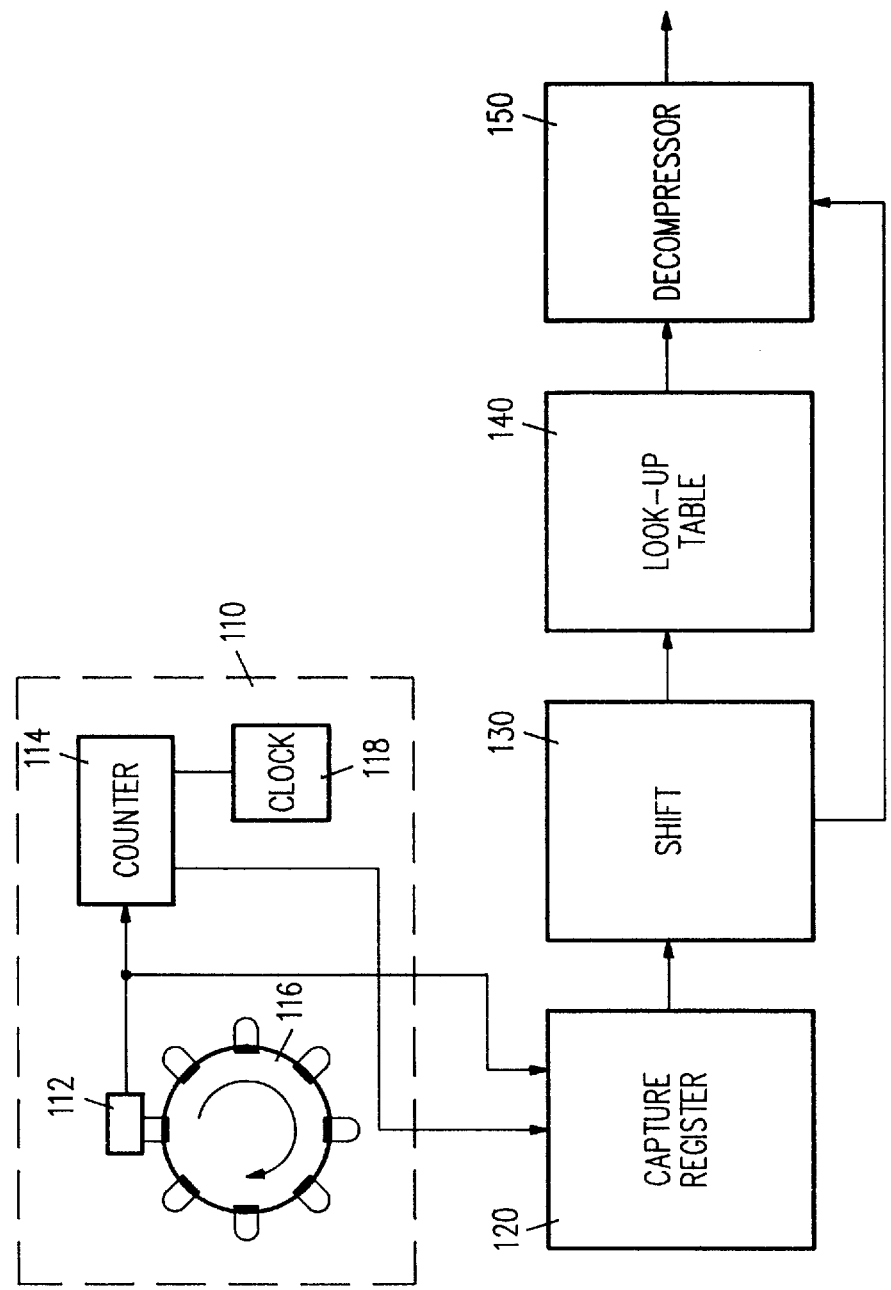
FIG. 1 shows a block diagram of a rate sensor in accordance with the present invention.

FIG. 1 shows a block diagram of a rate sensor in accordance with the present invention. The rate sensor shown is employed in an anti-lock braking system to provide a digital signal indicating the rotational velocity of a tire. Typical anti-lock braking systems periodically determine the velocity and acceleration of a rotating automobile tire. If a brake locks during braking, the tire stops rotating and skids as the automobile keeps moving. An anti-lock braking system determines, from the velocity and acceleration when a skid occurs and temporarily releases the brake. The temporary release of the brake stops the tire from skidding and therefore increases traction between the tire and road and reduces the overall stopping distance of the automobile. In a typical anti-lock braking system, the velocity must be sensed at least once every 5 ms. Accordingly, the tire travels only a short distance between consecutive sensing of velocity, and fast velocity and acceleration calculations are required.

In FIG. 1, a timer 110 includes a counter 114 which counts clock pulses from a clock circuit 118. Counter 114 monitors a wheel speed sensor which includes a gear 116 which rotates at a rate that is proportional to the rotational velocity of a tire. Iron teeth on gear 116 rotate between a magnet and coil 112 and periodically strengthen the magnetic field through coil 112. The changing magnetic field induces an AC voltage which is provided to counter 114 so that counter 114 is periodically reset according to the frequency of the AC voltage from coil 112. Just before counter 114 is reset, a capture register 120 captures from counter 114 a time count C. If wheel 116 stops moving so that clock-counter 114 is not reset within the desired sampling period, a maximum time value is provided to capture register 120 and error status signal may be set. In one exemplary anti-lock braking system, clock 118 provides a 1 MHz clock signal, and the time count C represents the number of microseconds required for gear 116 to rotate the fixed distance from one tooth to the next.

The time count C is typically stored in capture register 120 in an integer representation. An integer representation is a set of bits where each bit represents a different power of two, and the least significant bit (LSB) represents $2^0$. For example, a binary integer representation of thirteen is 1101 because $1\times2^3+1\times2^2+0\times2^1+1\times2^0$ equals 13. An integer representation is a special case of a fixed point representation. In a fixed point representation, each bit represents a different power of two, but the LSB is not restricted to representing $2^0$. The LSB represents a power of two that depends on the format of the fixed point representation. For example, in one unsigned 4-bit binary fixed point representation, the LSB corresponds to $2^{-3}$, and 1101 represents 1.625 or ($1\times2^0+1\times2^{-1}+0\times2^{-2}+1\times2^{-3}$).

The structure shown in timer 110 is only one example which can be employed in an anti-lock braking system. Other timers which are known or yet to be developed can be used in place of timer 110.

Capture register 120 stores the count C which indicates the time for wheel 116 to rotate one tooth. Capture register 120 can be a shift register, a memory location, or another storage device. From a fixed distance d that a tire travels while wheel 116 rotates from one tooth to the next and the time $\Delta T$ required to travel the distance d, a velocity v may be determined. The velocity v is proportional to the multiplicative inverse of the time $\Delta T$ or the time count C (i.e., $v \propto \Delta T^{-1} \propto C^{-1}$), so that the multiplicative inverse $C^{-1}$ of count C can be used instead of the velocity v in calculations performed by the anti-lock braking system. For example, the anti-lock braking system can release braking depending on the inverse of the count or the rate of change in the inverse of the count. The velocity and acceleration in standard length and time units are not needed.

For fixed distance d, a velocity $v=d/\Delta T$ can be determined using a look-up table that includes velocity values for every possible value of the time interval $\Delta T$. This would eliminate the need for a conventional multiplier or divider but, in many applications, such look-up tables would be too large to be practical. A mathematical property of division permits use of a smaller look-up table. If time interval $\Delta T = 2^N * \Delta t$, then the velocity $v_{\Delta T}$ which corresponds to the time $\Delta T$ and the velocity $v_{\Delta t}$ which corresponds to the time $\Delta t$ are related by the following equation.

$$v_{\Delta T} d/\Delta T = d/(2^N * \Delta t) = 2^{-N} * (d/\Delta t) = 2^{-N} * v \Delta t.$$

Accordingly, if velocity $v_{\Delta t} = d/\Delta t$ is known for values of time $\Delta t$ between 1 and 2 (or values between any successive powers of two), velocity $v_{\Delta T}$ for all other values of time $\Delta T$ can be determined by multiplication of $v_{\Delta t}$ by an appropriate power of two. In digital systems, multiplying by a power of two is equivalent to a binary shift of a fixed point representation, and neither a multiplier nor a divider is required.

In order to use a smaller look-up table, shift block 130 converts the count C into a factor X between 1 and 2 and an exponent N for a power of two, with C equal to $X*2^N$. Such conversions are well known in the art and commonly implemented using many well known techniques for conversion of an integer representation to a floating point representation. Shift block 130 may, for example be implemented as software executed on a processor or as hardware which causes the value in register 120 to be factored.

In one embodiment, the count C is initially stored in capture register 120 in an integer representation, and then shifted to the left. The shift block 130 counts the number of single bit logical left shifts required to shift the most significant non-zero bit of the count C into a carry bit. If the number of shifts is S and capture register 120 contains R bits, the exponent N is R-S. After shifting the count in register 120, the shifted value in register 120 indicates a fraction X' which is between 0 and 1. The carry bit is always one. Accordingly, the combination of the carry bit and the fraction X' indicates a factor X between 1 and 2. The fraction X' provides an address for a look-up table 140 and is approximately equal to the mantissa of the logarithm base 2 of the factor X.

Look-up table 140 holds multiplicative inverse values Y corresponding to a domain of values X between 1 and 2. Look-up table 140 may be implemented as a portion of RAM, ROM, EPROM, EEPROM, or other memory which, in response to an address signal indicating the value X, provides to a decompressor 150 a value Y indicating the multiplicative inverse $X^{-1}$ of the value X. The multiplicative inverse $X^{-1}$ equals the special case of a quotient with dividend d equal to one. Decompressor 150 converts the value Y from look-up table 140 into the desired velocity (or multiplicative inverse) by combining Y with the exponent N provided by shift block 130. The actions of decompressor 150 depend on the representation of the values Y in the look-up table, and are disclosed in detail for specific embodiments below. Decompressor 150 is typically implemented in software.

In one embodiment, the value Y supplied by look-up table 140 is a floating point representation of the multiplicative inverse $X^{-1}$ of the factor X, and decompressor 150 subtracts of the exponent N from an exponent of the floating point representation of the value Y to provide a floating point representation of the inverse $C^{-1}$ of count C.

In another embodiment, the value Y supplied by look-up table 140 is a fixed point representation of the multiplicative inverse Xhu −1, and decompressor 150 shifts the value Y to the right N bits. Table 1 shows an example of a look-up table having for stored values Y which equal the multiplicative inverse $X^{-1}$.

TABLE 1

| X | Y |
|---|---|
| 1.000 | 1.000 |
| 1.001 | .1110 |
| 1.010 | .1101 |
| 1.011 | .1100 |
| 1.100 | .1011 |
| 1.101 | .1010 |
| 1.110 | .1001 |
| 1.111 | .1000 |
| 10.00 | .1000 |

Both X and Y are shown as 4-bit binary values, and stored values Y are rounded to four bits of accuracy.

In still another embodiment, look-up table 140 provides a value Y in a compressed format which reduces the amount of memory required for look-up table 140, and decompressor 150 decompresses a value Y from look-up table 140 while combining the value Y with the exponent N.

In an example embodiment wherein look-up table 140 contains compressed values Y, capture register 120 initially holds a count C which is to be inverted. Count C is provided as a 16-bit integer between $0000 and $FFFF ("$" indicates hexadecimal) and capture register 120 is a 16-bit register. Other limits for the count C are possible. For example, a minimum count such as $1FF may be set to avoid determination of the multiplicative inverse of zero. Also, an upper limit of $7FFF permits use of conventional 16-bit signed integers capable of representing positive or negative values.

The integer representation of count C is shifted left S bits until the most significant bit (MSB) of the count C is shifted into the carry position. After S shifts capture register 120 contains a high byte X' which ranges from $00 to $FF. Rounding to nine bits of accuracy, factor X equals (1+X'/256), and the count value C equals $X*2^N$ where exponent N equals 16 minus S.

The carry bit combined with high byte X' expresses the factor X to nine significant bits in a fixed point format, with the carry bit being the integer part and byte X' being the fractional part. In this format, the factor X ranges from $100 to $1FF and represents values between 1 and 2. The most significant bit of X, the bit in the carry position, is always 1 and can be ignored when using look-up table 140. The byte X' indicates the factor X and is the address signal supplied to look-up table 140. In another embodiment, the byte X' is transformed before being applied as an address signal, for example by adding or subtracting an offset or shifting to provide an even address for retrieving values Y that are word size or larger.

All inverses $X^{-1}$ for 1<X<2 are greater than 0.5 but less than 1. Therefore, fixed point representations of the inverses $X^{-1}$ have a bit corresponding the power $2^{-1}$ set. Accordingly, fixed point values Y stored in look-up table 140 do not need to store the bit representing $2^{-1}$. Decompressor 150 can append the bit representing $2^{-1}$ before producing a final inverse value. This permits eight bits in look-up table 140 to provide an inverse to nine bits of accuracy.

A bit corresponding to $2^{-2}$ in a fixed point representation of the inverse $X^{-1}$ is 0 for X greater than 4/3 and 1 for X less than 4/3. Accordingly, the bit corresponding to $2^{-2}$ can be removed from values Y stored in look-up table 140, and decompressor 150 can add the removed bit when decompressing a Y value. Decompressor 150 compares the value X to 4/3 and if X is less than 4/3, sets the bit in value Y corresponding to $2^{-2}$. If X is greater than 4/3, decompressor 150 clears the bit corresponding to $2^{-2}$.

Further, for the 256 possible 9-bit X values from $100 to $1FF, there are to 9-bit accuracy 256 different inverses $X^{-1}$. Values X which are kept to ten bits of accuracy differ from 9-bit values X by an appended least significant bit which is either 0 or 1. 10-bit values X with an appended bit equal to 0 are referred to herein as even. 10-bit values X with an appended bit equal to 1 are referred to herein as odd. If the appended bit is 0, the values from the table provide the correct inverse to nine bits of accuracy. If the appended bit makes X is odd, the inverse to 9-bits of accuracy is either the same as the inverse of the even value X or differs only in the least significant bit from the inverse of the even value X. Accordingly, if the difference in the inverses between neighboring even and odd values X can be determined, the look-up table can provide inverses for 512 10-bit values X using 256 different values Y one for each value X between $100 and $1FF.

Storing in a look-up table only even or only odd values of the inverse is not restricted to 9 bits of accuracy. When values X have one more bit of accuracy than the inverses $X^{-1}$ have, the inverses $X^{-1}$ can be determined using a look-up table with half the number of entries as there are values X. For example, to ten bits of accuracy, there are 512 different values X between 1 and 2 but the inverse $X^{-1}$ to nine bits of accuracy can be determined using only 256 entries.

To use values Y for only even values X or only odd values X, some method is required for determining if the neighboring value X has the same approximate inverse or an inverse that differs by one in the least significant bit. One method for indicating whether the inverse differs is providing in each value Y a code bit to indicate whether the inverse for the neighboring value X is the same. For example, with fixed point representations of the inverse, the bit representing $2^{-1}$ is always set and would typically not be provided in the look-up table. The bit representing $2^{-2}$ is 0 for X greater than 4/3 and 1 for X less than 4/3. Accordingly, the bit representing $2^{-2}$ can be replaced with a code bit that, for example, is 1 if the inverses $X^{-1}$ and $(X+1)^{-1}$ for neighboring even and odd values X and X+1 differ and is 0 if the neighboring even and odd values are the same to the accuracy to be provided. Decompressor 150 changes values from look-up table 140 according to the code bit then reconstructs the correct $2^{-2}$ bit by comparing the factor X to 4/3 (or comparing X' to $55).

Table 2 contains a list of 8-bit values Y corresponding to X values between $100 and $1FF.

TABLE 2

| | | | | | | | |
|---|---|---|---|---|---|---|---|
| $FF, | $FD, | $FB, | $F9, | $F7, | $F5, | $73, | $F2 |
| $F0, | $EE, | $EC, | $EA, | $E8, | $66, | $E5, | $E3 |
| $E1, | $DF, | $DE, | $DC, | $DA, | $58, | $D7, | $D5 |
| $53, | $D2, | $D0, | $4E, | $CD, | $CB, | $CA, | $C8 |
| $46, | $C5, | $C3, | $C2, | $C0, | $BF, | $BD, | $BC |
| $BA, | $B9, | $B7, | $B6, | $B4, | $B3, | $31, | $B0 |
| $2E, | $AD, | $AC, | $2A, | $A9, | $27, | $A6, | $A5 |
| $23, | $A2, | $A1, | $1F, | $9E, | $9D, | $1B, | $1A |
| $99, | $98, | $16, | $95, | $94, | $93, | $11, | $90 |
| $8F, | $8E, | $0C, | $0B, | $8A, | $89, | $88, | $87 |
| $05, | $04, | $03, | $82, | $81, | $80, | $FF, | $7D |
| $7C, | $7B, | $7A, | $F9, | $F8, | $F7, | $F6, | $F5 |
| $F4, | $F3, | $F2, | $F1, | $6F, | $6E, | $6D, | $6C |
| $6B, | $6A, | $69, | $68, | $67, | $66, | $65, | $64 |
| $63, | $E3, | $E2, | $E1, | $E0, | $DF, | $DE, | $DD |
| $DC, | $5B, | $5A, | $59, | $58, | $57, | $56, | $D6 |
| $D5, | $D4, | $D3, | $52, | $51, | $50, | $4F, | $CF |
| $CE, | $CD, | $4C, | $4B, | $4A, | $49, | $C9, | $C8 |
| $47, | $46, | $45, | $C5, | $C4, | $43, | $42, | $41 |
| $C1, | $C0, | $3F, | $3E, | $3D, | $BD, | $3C, | $3B |
| $3A, | $BA, | $39, | $38, | $37, | $B7, | $36, | $35 |
| $34, | $B4, | $33, | $32, | $B2, | $31, | $30, | $2F |
| $AF, | $2E, | $2B, | $AD, | $2C, | $2B, | $AB, | $2A |
| $29, | $A9, | $28, | $27, | $A7, | $26, | $25, | $A5 |
| $24, | $23, | $A3, | $22, | $21, | $A1, | $20, | $1F |
| $9F, | $1E, | $9E, | $1D, | $1C, | $9C, | $1B, | $1A |
| $1A, | $19, | $99, | $18, | $17, | $17, | $16, | $96 |
| $15, | $14, | $14, | $13, | $93, | $12, | $92, | $11 |
| $10, | $10, | $0F, | $8F, | $0E, | $8E, | $0D, | $0C |
| $0C, | $0B, | $0B, | $0A, | $8A, | $09, | $89, | $08 |
| $88, | $07, | $87, | $06, | $05, | $05, | $04, | $04 |
| $03, | $03, | $02, | $02, | $01, | $01, | $00, | $00 |

From the 256 8-bit values Y in Table 2, 9-bit inverses $X^{-1}$ for 512 10-bit factors X can be determined as described above.

Using both compression techniques described above, decompressor 150 reconstructs the inverse $X^{-1}$ from the value Y provided by the look-up table and combines the inverse $X^{-1}$ with the exponent N. Such decompression or conversion would typically be implemented in software executed by a microprocessor or a microcontroller. A COP888 assembly language program which implements the above described decompression is in the appendix. The instruction set for the COP888 is publicly known and described in the "1992 Embedded Controller Data Book" available from National Semiconductor, Inc.

Figure 2:
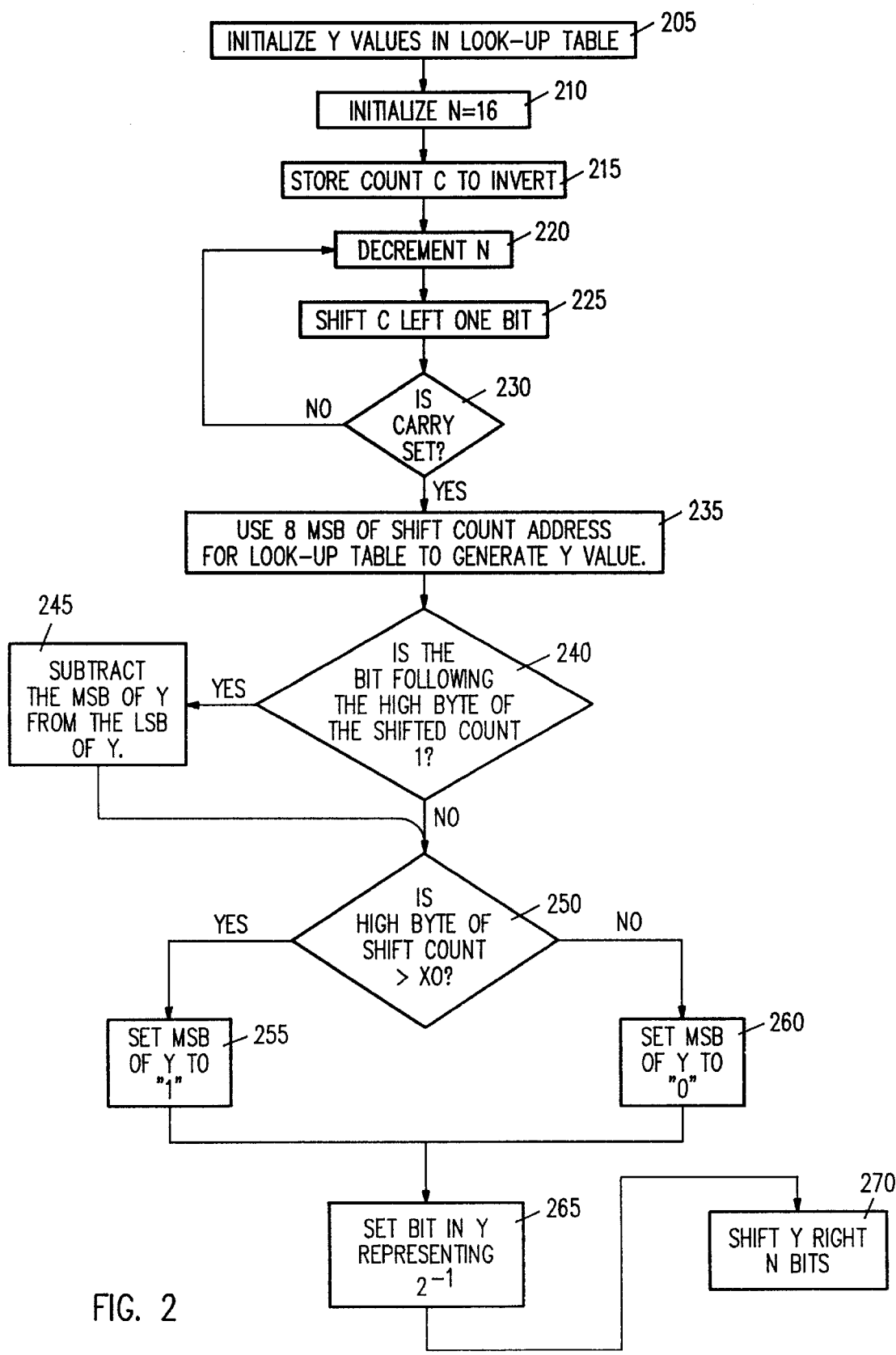
FIG. 2 shows a flow diagram of a process for providing a signal indicating a multiplicative inverse using a look-up table and look-up table compression techniques.

FIG. 2 shows a flow diagram of a process for providing a signal indicating a multiplicative inverse using a look-up table and compression techniques similar to those described above. In step 205, a look-up table is provided with the 256 values Y shown in Table 2. Each 8-bit value Y indicates a 9-bit fixed point representation of a multiplicative inverse $X^{-1}$ of an even factor X between 1 and 2 ($100 and $1FF). Of the eight bits $Y_7$–$Y_0$ in the values Y, bits $Y_6$ to $Y_0$ correspond to $2^{-3}$ to $2^{-9}$ respectively in a fixed point representation of the inverse $X^{-1}$. Bit $Y_7$ indicates whether a neighboring odd factor has the same inverse as the even factor.

In step 210, an exponent N is initialized to the number of bits which a register can hold. The count C is measured and stored into the register during step 215. Steps 220, 225, and 230 implement a loop which counts the number of single bit left shifts required to shift the most significant non-zero bit of the count C in to the carry position. In step 235, the eight MSBs of the shifted count provide an address to select a value Y from the look-up table.

The value Y is then decompressed as follows. If the bit following the high byte X' of the shifted count is one, then the factor X is odd, and step 245 is executed before step 250, otherwise step 245 is skipped. In step 245, if bit $Y_7$ is one then one is subtracted from the least significant bit of Y, but if the most significant bit $Y_7$ is zero then Y is unchanged.

In step 250, a bit indicating $2^{-2}$ is reconstructed from the shifted count. If the high byte X' of the shifted count is greater than $55 then bit $Y_7$ is cleared (step 260), otherwise bit $Y_7$ is set to one (step 255). Finally, a bit corresponding to $2^{-1}$ is set providing nine bits of accuracy (step 265), and the Y value is shifted according to the exponent N (step 270).

Although the present invention has been described with reference to particular embodiments, the description is only an example. Many other embodiments are possible. In particular, even though much of preceding disclosure was directed to determination of velocity in an anti-lock braking system, the present invention is not so limited. The circuits and processes described may be used in any digital system which determines a multiplicative inverse or determines a quotient of a fixed dividend. For example, if timer 110 in FIG. 1 is replaced by a timer which measures the time between heartbeats, the circuitry and methods disclosed above can determine a heart rate. Further, the quantity inverted need not be a time. Timer 110 can be replaced, for example, by a sensor which provides a distance for a slope determination. Also, although the above embodiments employ look-up tables which provide values Y for a factor X between 1 and 2, look-up table ranges for the factor X may be between any two successive powers of two. Also, although much of the disclosure was directed to circuits and methods which determine multiplicative inverses, methods and circuits disclosed may be used to determine the quotient of a fixed dividend by a variable divisor. In view of this disclosure, other applications and variations of the present invention will be apparent to those skilled in the art.

APPENDIX

| | | |
|---|---|---|
| TIM1L | = | 0EA |
| TIM1H | = | 0EB |
| T1RAL | = | 0EC |
| T1RAH | = | 0ED |
| T1RBL | = | 0E6 |
| T1RBH | = | 0E7 |
| CNTRL | = | 0EE |
| PSW | = | 0EF |
| GIE | = | 0 |
| BUSY | = | 2 |
| ICNTRL | = | 0E8 |
| TPND | = | 5 |
| T0PND | = | 5 |
| T2TIML | = | 0C0 |
| T2TIMH | = | 0C1 |
| T2CNTRL | = | 0C6 |
| T3CNTRL | = | 0B6 |
| LFRAL | = | 0C2 |
| LFRAH | = | 0C3 |
| RFRAL | = | 0C4 |
| RFRAH | = | 0C5 |
| LRRAL | = | 0B2 |
| LRRAH | = | 0B3 |
| RRRAL | = | 0B4 |
| RRRAH | = | 0B5 |
| PFLG | = | 010 |
| FLG | = | 011 |
| UPD | = | 0 |
| BULB | = | 1 |
| BPT | = | 012 |
| BPTH | = | 013 |
| MSK | = | 014 |
| EFLG | = | 015 |
| POUT | = | 016 |
| OIMG | = | 017 |
| N | = | 0F0 |
| CNTR | = | 0F1 |
| LFCNT | = | 0F2 |
| RFCNT | = | 0F3 |
| LRCNT | = | 0F4 |
| RRCNT | = | 0F5 |
| DISCNT | = | 0F6 |
| DSPT | = | 0F7 |
| CNT | = | 0F9 |
| DC1 | = | 0FA |
| TEMPL | = | 01B |
| TEMPH | = | 01C |
| VMINL | = | 0 |
| VMINH | = | 1 |
| PMAXL | = | 0 |
| PMAXH | = | 1 |
| VMAXL | = | 0 |
| VMAXH | = | 1 |
| PL | = | 88 |
| LFEDGL | = | 020 |
| LFEDGH | = | 021 |
| LFLASL | = | 022 |
| LFLASH | = | 023 |

- 21 -

```
LFPERL   =   024
LFPERH   =   025
LFVEL    =   026
LFVELH   =   027
LFFIL    =   028
LFFILH   =   029
LFLAG    =   02A
LFLAGH   =   02B
LFDEC    =   02C
LFSLP    =   02D

RFEDGL   =   02E
RFEDGH   =   02F
RFLASL   =   030
RFLASH   =   031
RFPERL   =   032
RFPERH   =   033
RFVEL    =   034
RFVELH   =   035
RFFIL    =   036
RFFILH   =   037
RFLAG    =   038
RFLAGH   =   039
RFDEC    =   03A
RFSLP    =   03B

LREDGL   =   03C
LREDGH   =   03D
LRLASL   =   03E
LRLASH   =   03F
LRPERL   =   040
LRPERH   =   041
LRVEL    =   042
LRVELH   =   043
LRFIL    =   044
LRFILH   =   045
LRLAG    =   046
LRLAGH   =   047
LRDEC    =   048
LRSLP    =   049

RREDGL   =   04A
RREDGH   =   04B
RRLASL   =   04C
RRLASH   =   04D
RRPERL   =   04E
RRPERH   =   04F
RRVEL    =   050
RRVELH   =   051
RRFIL    =   052
RRFILH   =   053
RRLAG    =   054
RRLAGH   =   055
RRDEC    =   056
RRSLP    =   057

VVEL     =   058
VVELH    =   059
```

L:\DMS\5987\WS-2314_\0073775.03

- 22 -

```
LF       =    LFEDGL
RF       =    RFEDGL
LR       =    LREDGL
RR       =    RREDGL

ENUI     =    0BC
BAUD     =    0BD
PSR      =    0BE
TBUF     =    0B8
PORTLD   =    0D0
PORTLC   =    0D1

PORTGD   =    0D4
PORTGC   =    0D5
PORTGP   =    0D6
PORTD    =    0DC
MAXPER   =    32000
THRES    =    5
SIO      =    0E9

.LIST 049

.CHIP 888

LD     SP,#06F
           LD     PORTLC,#07
           LD     PORTGC,#07F
           LD     ICNTRL,#0
           LD     ENUI,#020
           LD     BAUD,#09
           LD     PSR,#060
           LD     DISCNT,#6
           LD     DSPT,#1
           LD     FLG,#0
           LD     N,#0FF
           LD     T1RAL,#0FF
           LD     T1RAH,#09
           LD     T1RBL,#0FF
           LD     T1RBH,#09
           LD     CNTRL,#098
           LD     T2CNTRL,#055
           LD     T3CNTRL,#055
           SBIT   1,PORTLD              ;set up cs for vrs
           LD     B,#LFCNT
           LD     [B+],#0
           LD     [B+],#0
           LD     [B+],#0
           LD     [B+],#0
           JSR    INIT1
           LD     MSK,#0F
           LD     B,#LFVEL
DAG:       LD     CNTR,#6
DAG0:      LD     [B+],#0
           DRSZ   CNTR
           JP     DAG0
           LD     A,B
           ADD    A,#08
           IFGT   A,#055
           JP     DAG1
```

- 23 -

```
        X       A,B
        JP      DAG
DAG1:   LD      B,#VVEL
        LD      [B+],#0F
        LD      [B],#0
        LD      PSW,#1

LOOP:   NOP
        IFBIT   TOPND,ICNTRL
        JSR     DO5MS
        JSR     GETVRS
        JP      LOOP

DO5MS:  NOP
        RBIT    TOPND,ICNTRL
        RBIT    GIE,PSW
        RBIT    UPD,FLG
        LD      B,#LF
        LD      X,#LF+2
        LD      A,LFCNT
        JSR     GPERX
        X       A,LFCNT
        SBIT    GIE,PSW
        LD      X,#LFPERL
        JSR     LOOK
        RBIT    GIE,PSW
        LD      B,#RF
        LD      X,#RF+2
        LD      A,RFCNT
        JSR     GPERX
        X       A,RFCNT
        SBIT    GIE,PSW
        LD      X,#RFPERL
        JSR     LOOK
        RBIT    GIE,PSW
        LD      B,#LR
        LD      X,#LR+2
        LD      A,LRCNT
        JSR     GPERX
        X       A,LRCNT
        SBIT    GIE,PSW
        LD      X,#LRPERL
        JSR     LOOK
        RBIT    GIE,PSW
        LD      B,#RR
        LD      X,#RR+2
        LD      A,RRCNT
        JSR     GPERX
        X       A,RRCNT
        SBIT    GIE,PSW
        LD      X,#RRPERL
        JSR     LOOK
        JSR     GSLP
        JSR     DISP
        JSR     DAC
        IFBIT   BULB,FLG
        JP      DO5A
        DRSZ    N
        RET
        RBIT    3,PORTD
```

- 24 -

```
        RBIT    2,PORTD
        SBIT    BULB,FLG
        RET
DO5A:
        LD      A,PFLG
        IFGT    A,#0
        JP      DO5B
        DRSZ    N
        JP      DO5C
        RBIT    3,PORTGD
        RBIT    2,PORTGD
DO5C:   JSR     OUT

;       JSR     GETVRS
;       JSR     DISP
        RET
DO5B:
        IFBIT   3,PORTD
        JP      DO5D
        SBIT    3,PORTGD
        SBIT    2,PORTGD
        LD      N,#0FF
        JP      DO5C
DO5D:   RBIT    3,PORTGD
        RBIT    2,PORTGD
        LD      B,#VVEL
        LD      [B+],#0
        LD      [B],#0
        JP      DO5C

.=0FF
VIS

GMAX:
        LD      A,X
        ADD     A,#3
        X       A,X
        X       A,B                     ;B -> VEL    X->FILH
        LD      A,[X]
        RC
        RRC     A
        X       A,[X-]
        LD      A,[X]
        RRC     A                       ; FIL = FIL/2
        RC
        ADC     A,[B]
        X       A,[X+]
        LD      A,[B+]
        PUSH    A                       ; PUSH LOW BYTE VEL FOR DECEL CALC.
        LD      A,[X]                   ; FIL = FIL + VEL
        ADC     A,[B]
        X       A,[X]                   ;B -> VELH   X -> FILH
        LD      A,[X+]
        LD      A,[X+]                  ; X -> LAGH
        LD      B,#TEMPH
```

```
              JSR       SHIF4
              JSR       SUB4               ;  VLAG - VLAG - VLAG/8   RETURN WITH X ->
   GDECEL:    LD        A,[B-]             ; B -> TEMP [LBYTE LAG/8]
              SC
              POP       A                  ; POP LOW BYTE VEL
              X         A,[B]
              SUBC      A,[B]              ; DECEL = LAG/8 - VEL
              XOR       A,#080
              PUSH      A                  ;PUSH DECEL

LD        A,X
              ADD       A,#-4
              X         A,B                ; B -> VEL   X -> LAG
              LD        A,[X]              ; ADD VEL TO VLAG
              RC
              ADC       A,[B]
              X         A,[X+]
              LD        A,[B+]
              LD        A,[X]
              ADC       A,[B]
              X         A,[X+]             ;X -> DECEL
              POP       A
              X         A,[X-]             ;POP  AND STORE DECEL
              LD        B,#VVEL
              LD        A,[X-]
              LD        A,[X-]             ;X -> FIL
              LD        A,[X-]
              SC                           ;CHK IF FIL > VVEL
              LD        A,[X+]
              SUBC      A,[B]
              LD        A,[B+]
              LD        A,[X]
              SUBC      A,[B]
              IFNC
              RET
              LD        A,[X-]             ;UPDATE VVEL
              X         A,[B-]
              LD        A,[X+]
              X         A,[B+]
              SBIT      UPD,FLG
              RET                          ;X -> LAGH

SHIF4:     RC
              LD        A,[X-]
              RRC       A
              X         A,[B-]
              LD        A,[X+]
              RRC       A
              X         A,[B+]
   ;          JSR       SHIF2
   SHIF2:     LD        A,[B]
              RC
              RRC       A
              X         A,[B-]
              LD        A,[B]
              RRC       A
              X         A,[B+]
```

L:\DMS\5987\NS-2314_\0073775.03

- 26 -

```
          RET
SUB4:     LD      A,[X-]
          LD      A,[B-]
          SC
          LD      A,[X]
          SUBC    A,[B]
          X       A,[X+]
          LD      A,[B+]
          LD      A,[X]
          SUBC    A,[B]
          X       A,[X-]          ;SUB VLAG-VLAG/4      X -> LAG
          RET
GPERX:    IFGT    A,#128
          JMP     GPERY
          IFGT    A,#0
          RET
GPERX1:   LD      B,#T2TIMH
          LD      A,X
          ADD     A,#1
          X       A,X
          JSR     CAPTIM          ;CAP TIME
          LD      A,[X-]
          LD      A,X
          X       A,B
          LD      A,B
          ADD     A,#-2
          X       A,X
          SC
          LD      A,[X+]          ; X->EDGE     B->LAST
          SUBC    A,[B]           ;EDGE - TIM ->[B]
          X       A,[B+]
          LD      A,[X+]
          SUBC    A,[B]
          X       A,[B]
          LD      A,[B-]
          IFGT    A,#127
          JMP     MAXPB
          LD      A,[B+]
          LD      A,[B+]
          LD      A,[X+]
          SC
          SUBC    A,[B]
          LD      A,[B+]
          LD      A,[X]
          SUBC    A,[B]
          IFC
          JP      MOVP
          CLR     A
          RET

MOVP:     LD      A,[X-]
          X       A,[B-]
          LD      A,[X]
          X       A,[B]
          CLR     A
          RET
```

L:\DMS\5987\NS-2314_\0073775.03

```
GPERY:
        NOP                             ;ENTRY
        LD      A,B                     ;B>LAST
        ADD     A,#2                    ;X>CURRENT
        X       A,X
GPER0:  SC
        LD      A,[X+]                  ;LD A CURRENT
        SUBC    A,[B]                   ;LAST - CURRENT -> PERIOD
        PUSH    A                       ;SAVE L(PERIOD)
        LD      A,[B+]                  ;BUMP B
        LD      A,[X+]
        SUBC    A,[B]
        X       A,B                     ;SAVE H(PERIOD)
        POP     A                       ;POP L(PERIOD)
        X       A,[X+]                  ;STORE L(PERIOD)
        X       A,B
        X       A,[X]                   ;STORE H(PERIOD)
        LD      A,X
        X       A,B
        LD      A,[B-]
        IFGT    A,#127
        JP      MAXP
        CLR     A
        RET
MAXPB:  LD      A,[B+]
        LD      A,[B+]
MAXP:
        LD      [B+],#L(MAXPER)
        LD      [B],#H(MAXPER)
        LD      A,#2
        RET
.=01E0
.ADDRW  DEFA,MIWU,T3B,T3A,T2B,T2A,UARTT,UARTR
.ADDRW  RESV,MWIRE,T1B,T1A,T0,EXTI,RESV,SOFTW
SOFTW:  JP      SOFTW
RESV:   RETI
EXTI:   RETI
T0:
T1A:
T1B:
MWIRE:
UARTR:
UARTT:
MIWU:
DEFA:   RETI
T2A:    RBIT    4,T2CNTRL
        IFBIT   3,T2CNTRL
        JP      T2A1
        RETI
T2A1:   RBIT    3,T2CNTRL
        PUSH    A
        LD      A,LFRAL
        X       A,LFEDGL
        X       A,LFLASL
        LD      A,LFRAH
        X       A,LFEDGH
        X       A,LFLASH
        DRSZ    LFCNT
```

- 28 -

```
              NOP
              POP      A
              RETI

T2B:      RBIT     4,T2CNTRL
              IFBIT    1,T2CNTRL
              JP       T2B1
              RETI
    T2B1:     RBIT     1,T2CNTRL
              PUSH     A
              LD       A,RFRAL
              X        A,RFEDGL
              X        A,RFLASL
              LD       A,RFRAH
              X        A,RFEDGH
              X        A,RFLASH
              DRSZ     RFCNT
              NOP
              POP      A
              RETI

T3A:      RBIT     4,T3CNTRL
              IFBIT    3,T3CNTRL
              JP       T3A1
              RETI
    T3A1:     RBIT     3,T3CNTRL
              PUSH     A
              LD       A,LRRAL
              X        A,LREDGL
              X        A,LRLASL
              LD       A,LRRAH
              X        A,LREDGH
              X        A,LRLASH
              DRSZ     LRCNT
              NOP
              POP      A
              RETI

T3B:      RBIT     4,T3CNTRL
              IFBIT    1,T3CNTRL
              JP       T3B1
              RETI
    T3B1:     RBIT     1,T3CNTRL
              PUSH     A
              LD       A,RRRAL
              X        A,RREDGL
              X        A,RRLASL
              LD       A,RRRAH
              X        A,RREDGH
              X        A,RRLASH
              DRSZ     RRCNT
              NOP
              POP      A
              RETI

DAC:
              LD       B,#TEMPL
```

L:\DMS\5987\NS-2314_\0073775.03

```
            LD      [B],#090
            LD      X,#LFVEL
            JSR     DAC1
            LD      [B],#098
            JSR     DAC1
            LD      [B],#09C
            JSR     DAC1
            LD      [B],#094
            LD      X,#LFDEC
            JSR     DAC0
            RET

GSLP:
            LD      X,#LFSLP
            LD      PFLG,#0
GSLP0:      LD      A,X                     ; X-> SLP
            ADD     A,#-5
            X       A,B                     ; B ->FIL
            SC
            LD      A,VVEL
            SUBC    A,[B]
            X       A,[X]
            LD      A,[B+]
            LD      A,VVELH
            SUBC    A,[B]
            IFGT    A,#0
            JP      GSLP1
GSLP2:      LD      A,[X]
            SWAP    A
            AND     A,#0F                   ;USE TEMP FOR STORAGE
            ADD     A,#0F
            X       A,TEMPL
            LD      A,[X]
            LD      B,#PFLG
            IFGT    A,TEMPL
            SBIT    4,[B]
            LD      A,[B]
            RC
            RRC     A
            X       A,[B]

LD      A,X
            ADD     A,#14
            IFGT    A,#058
            JP      CONT
            X       A,X
            JP      GSLP0
GSLP1:      LD      A,#0FF
            X       A,[X]
            JP      GSLP2

CONT:       IFBIT   UPD,FLG
            RET
CONT1:      LD      B,#VVEL
            SC
            LD      A,[B]
            SUBC    A,#1
            X       A,[B+]
            LD      A,[B]
            SUBC    A,#0
```

- 30 -

```
           X         A,[B]
           IFC
           RET
           CLRA
           X         A,[B-]
           CLRA
           X         A,[B]
           RET

.=0300
           .ADDR     PSPACE,P1DSP,P2DSP,P3DSP,P4DSP,PLF,PCR
DISP:      DRSZ      DISCNT
           NOP
           LD        A,DISCNT
           JID

P1DSP:     LD        B,#BPT
           LD        A,[B]
           AND       A,#0F
           JP        ASCII
P2DSP:     LD        B,#BPT
           LD        A,[B]
           JP        NSWAP
P3DSP:     LD        B,#BPTH
           LD        A,[B]
           AND       A,#0F
           JP        ASCII
P4DSP:     LD        B,#BPTH
           LD        A,[B]
           JP        NSWAP
NSWAP:     SWAP      A
           AND       A,#0F
ASCII:     ADD       A,#030
           IFGT      A,#039
           ADD       A,#7
PUTC:      X         A,TBUF
           RET
PSPAC1:    LD        DISCNT,#5
           JP        PSPAC2
PSPACE:    LD        A,#020
           JSR       PUTC
           LD        DISCNT,#3
           LD        A,DSPT
           IFEQ      A,#0B
           JMP       PSPEC
           IFGT      A,#0B
           JP        PSPAC1
           IFGT      A,#05
           LD        DISCNT,#4
PSPAC2:    ADD       A,#L(DTAB-1)
           LAID
           X         A,B
           RBIT      0,PSW
           LD        A,[B+]
           X         A,BPT
           LD        A,[B]
           SBIT      0,PSW
           X         A,BPTH
           DRSZ      DSPT
           RET
```

```
                LD      DISCNT,#7
                LD      DSPT,#0F
                RET
PLF:            LD      A,#0A
                JP      PUTC
PCR:            LD      A,#0D
                JP      PUTC
DTAB:           .BYTE   LFPERL,EFLG,PFLG,LFSLP,LFDEC,VVEL,LFLAG,LFFIL,LFVEL,RFVEL,LRVEL,

PSPEC:          LD      A,LFVEL
                X       A,BPT
                LD      A,LFVELH
                X       A,BPTH
                LD      DISCNT,#4
                DRSZ    DSPT
                RET

OUT:            LD      A,PFLG
                AND     A,MSK
                IFBIT   3,PORTD
                CLR     A
                X       A,SIO
                RBIT    6,PORTGC        ;NORMAL PHASE
                RBIT    0,PORTGD
                SBIT    BUSY,PSW
OUT1:           IFBIT   BUSY,PSW
                JP      OUT1
                SBIT    0,PORTGD
                LD      A,SIO
                XOR     A,#078
                AND     A,#078
                RC
                RLC     A
                X       A,POUT
                LD      MSK,#0
                LD      A,LFDEC
                XOR     A,#080
                RC
                RRC     A
                ADD     A,#2
                IFGT    A,DC1
                LD      MSK,#0F
                DRSZ    DC1
                RET
                LD      DC1,#5
                RET

LD      X,#LFDEC
                JSR     OUT10
                LD      X,#RFDEC
                JSR     OUT10
                LD      X,#LRDEC
                JSR     OUT10
                LD      X,#RRDEC
                JSR     OUT10
                RET
OUT10:          LD      A,[X]
                XOR     A,#080
                RC
                RRC     A
```

- 32 -

```
            ADD     A,#2
            LD      B,#MSK
SAST:       IFGT    A,TEMPL
            SBIT    4,[B]
            LD      A,[B]
            RC
            RRC     A
            X       A,[B]
            RET

DAC1:       LD      A,[X+]
            X       A,[X]
            IFGT    A,#0
            SBIT    1,[B]
            X       A,[X]
            JMP     DAC0A

SEND:       SBIT    BUSY,PSW
SENDW:      IFBIT   BUSY,PSW
            JP      SENDW
            RET

.=0400

LOOK:       LD      B,#TEMPL
            LD      A,[X+]
            X       A,[B+]
            LD      A,[X+]
            X       A,[B-]
            LD      CNT,#07
LOK1:       RC
            LD      A,[B]
            ADC     A,[B]
            X       A,[B+]
            LD      A,[B]
            ADC     A,[B]
;           IFGT    A,#07F
            IFC
            JP      LOOK1
            X       A,[B-]
            DRSZ    CNT
            JP      LOK1
            LD      A,#0FF
            SC
            JMP     LOKX
LOOK1:
            X       A,[B]
            LD      A,[B]
            IFGT    A,#07F
            JP      LOOK3
            JMP     LOOK4
LOOK3:
            LAID
LOOK3B:     IFGT    A,#07F
            JP      LOOK3C
            JP      LOOK3D
LOOK3C:     IFBIT   7,TEMPL
            JSR     SUB1
LOOK3D:     AND     A,#07F
```

- 33 -

```
            X       A,[B]
            IFGT    A,#055
            JP      LOOK3A
            IFEQ    A,#055
            JSR     CASE1
            SBIT    7,[B]
LOOK3A:     X       A,[B]
            SC
            DRSZ    CNT
            JP      SHIFT1
            JP      LOKX
LOOK2:      DRSZ    CNT
            JP      SHIFT
LOKX:       X       A,[X+]
            CLR     A
            IFC
            ADD     A,#1
            X       A,[X-]
            JMP     GMAX            ;X -> VEL
SHIFT:      RC
SHIFT1:     RRC     A
            RC
            JP      LOOK2

SUB1:       SC
            SUBC    A,#1
            RET
CASE1:      IFBIT   7,TEMPL
            RETSK
            RET

CAPTIM:     LD      A,[B-]
            X       A,[X-]
            LD      A,[B+]
            X       A,[X]
            LD      A,[X+]
            IFGT    A,#127
            JP      CAPTI1
            RET
CAPTI1:     LD      A,[B]
            X       A,[X]
            RET

.=0480
LTAB:

.BYTE 0D5, 0D4, 0D3, 052, 051, 050, 04F, 0CF
.BYTE 0CE, 0CD, 04C, 04B, 04A, 049, 0C9, 0C8
.BYTE 047, 046, 045, 0C5, 0C4, 043, 042, 041
.BYTE 0C1, 0C0, 03F, 03E, 03D, 0BD, 03C, 03B
.BYTE 03A, 0BA, 039, 038, 037, 0B7, 036, 035
.BYTE 034, 0B4, 033, 032, 0B2, 031, 030, 02F
.BYTE 0AF, 02E, 02D, 0AD, 02C, 02B, 0AB, 02A
.BYTE 029, 0A9, 028, 027, 0A7, 026, 025, 0A5
.BYTE 024, 023, 0A3, 022, 021, 0A1, 020, 01F
.BYTE 09F, 01E, 09E, 01D, 01C, 09C, 01B, 01A
.BYTE 01A, 019, 099, 018, 017, 017, 016, 096
.BYTE 015, 014, 014, 013, 093, 012, 092, 011
.BYTE 010, 010, 00F, 08F, 00E, 08E, 00D, 00C
```

L:\DMS\5987\NS-2314_\0073775.03

```
        .BYTE 00C, 00B, 00B, 00A, 08A, 009, 089, 008
        .BYTE 088, 007, 087, 006, 005, 005, 004, 004
        .BYTE 003, 003, 002, 002, 001, 001, 000, 000

.BYTE 0FF, 0FD, 0FB, 0F9, 0F7, 0F5, 073, 0F2
        .BYTE 0F0, 0EE, 0EC, 0EA, 0E8, 066, 0E5, 0E3
        .BYTE 0E1, 0DF, 0DE, 0DC, 0DA, 058, 0D7, 0D5
        .BYTE 053, 0D2, 0D0, 04E, 0CD, 0CB, 0CA, 0C8
        .BYTE 046, 0C5, 0C3, 0C2, 0C0, 0BF, 0BD, 0BC
        .BYTE 0BA, 0B9, 0B7, 0B6, 0B4, 0B3, 031, 0B0
        .BYTE 02E, 0AD, 0AC, 02A, 0A9, 027, 0A6, 0A5
        .BYTE 023, 0A2, 0A1, 01F, 09E, 09D, 01B, 01A
        .BYTE 099, 098, 016, 095, 094, 093, 011, 090
        .BYTE 08F, 08E, 00C, 00B, 08A, 089, 088, 087
        .BYTE 0005,004, 003, 082, 081, 080, 0FF, 07D
        .BYTE 07C, 07B, 07A, 0F9, 0F8, 0F7, 0F6, 0F5
        .BYTE 0F4, 0F3, 0F2, 0F1, 06F, 06E, 06D, 06C
        .BYTE 06B, 06A, 069, 068, 067, 066, 065, 064
        .BYTE 063, 0E3, 0E2, 0E1, 0E0, 0DF, 0DE, 0DD
        .BYTE 0DC, 05B, 05A, 059, 058, 057, 056, 0D6

LOOK4:  LAID
        JMP     LOOK3B

INIT1:  LD      B,#LFPERL
        JSR     MAXP
        LD      B,#RFPERL
        JSR     MAXP
        LD      B,#LRPERL
        JSR     MAXP
        LD      B,#RRPERL
        JSR     MAXP
        RBIT    1,PORTLD
        LD      SIO,#085
        JSR     SEND
        LD      SIO,#0FF
        JSR     SEND
        LD      SIO,#086
        JSR     SEND
        LD      SIO,#0FF
        JSR     SEND
        SBIT    1,PORTLD
        RET

GETVRS: RBIT    1,PORTLD
        LD      TEMPL,#0
        SBIT    6,PORTGC        ;ALTERNATE PHASE
        LD      SIO,#1
        JSR     SEND
        LD      SIO,#1
        JSR     SEND
        IFBIT   4,SIO
        SBIT    0,TEMPL
        LD      SIO,#2
        JSR     SEND
        LD      SIO,#2
        JSR     SEND
        IFBIT   4,SIO
        SBIT    1,TEMPL
```

- 35 -

```
                LD      SIO,#3
                JSR     SEND
                LD      SIO,#3
                JSR     SEND
                IFBIT   4,SIO
                SBIT    2,TEMPL
                LD      SIO,#4
                JSR     SEND
                LD      SIO,#4
                JSR     SEND
                IFBIT   4,SIO
                SBIT    3,TEMPL
                LD      A,TEMPL
                OR      A,POUT
                X       A,EFLG
                SBIT    1,PORTLD
                IFBIT   3,PORTGD
                JP      GETVR1
                LD      A,EFLG
                AND     A,#0F0
                JSR     CKVAL
GETVR1:         LD      A,VVELH
                IFGT    A,#0
                RET
                LD      A,VVEL
                IFGT    A,#030
                RET
                LD      A,EFLG          ;CHECK EFLG AND SET LAMP <> 0
CKVAL:
                RBIT    3,PORTD
                IFGT    A,#0
                SBIT    3,PORTD
                RET

DAC0:           LD      A,[X+]
                RC
                RLC     A
                IFC
                SBIT    1,[B]
DAC0A:          RBIT    0,PORTD
                RC
                RLC     A
                IFC
                SBIT    0,[B]
                X       A,[B]
                X       A,SIO
                RBIT    6,PORTGC        ;NORMAL PHASE
                SBIT    BUSY,PSW
DACW:           IFBIT   BUSY,PSW
                JP      DACW
                LD      A,[B]
                X       A,SIO
                SBIT    BUSY,PSW
DACX:           IFBIT   BUSY,PSW
                JP      DACX
                SBIT    0,PORTD
                LD      A,[X+]
                RET

.END
```

L:\DMS\5987\NS-2314_\0073775.03

We claim:

1. A method of using a digital circuit to determine a quotient of a fixed dividend and a variable divisor, the method comprising the steps of:

storing, in a register, a first fixed point representation, the first fixed point representation representing the divisor and containing a plurality of bits and including a most significant non-zero bit;

shifting the first fixed point representation in the register until the most significant non-zero bit is shifted out of the register;

generating an address signal from a value in the register after shifting;

applying the address signal to a look-up table, wherein, in response to the address signal, the look-up table provides a data signal indicating a quotient of the fixed dividend and a factor, wherein the divisor equals a product of the factor and $2^N$ for some integer N; and converting the data signal provided by the look-up table into a signal indicating the quotient of the dividend and the divisor.

2. The method of claim 1, wherein:

storing the first fixed point representation further comprises storing the first fixed point representation in a register having the capacity to hold R bits, where R is an integer; shifting the first fixed point representation further comprises performing a logical shift left by S bits, wherein S is the least number of bits required to shift the most significant non-zero bit of the first fixed point representation out of the register and into a carry bit; and wherein the divisor equals a product of the factor and $2^N$ where integer N equals R-S.

3. The method of claim 2, wherein generating the address signal further comprises generating an address signal having bits equal to a plurality of bits from the register.

4. The method of claim 2, further comprising:

measuring a time required to travel a fixed distance; and providing a digital signal representing the time as the divisor.

5. The method of claim 1, wherein:

in response to the address signal, the look-up table provides a data signal representing a floating point representation of the quotient of the dividend and the factor; and the converting step comprises changing an exponent part of the floating point representation.

6. The method of claim 1, wherein converting the data signal further comprises:

converting the data signal provided by the look-up table into a second fixed point representation which represents the quotient of the dividend and the factor; and shifting the second fixed point representation to provide a fixed point representation of the quotient of the dividend and the divisor.

7. The method of claim 6, wherein converting the data signal into the second fixed point representation further comprises appending a predetermined most significant bit to the data signal. factor is less than a cut-off value and a second state when the factor is greater than the cut-off value.

8. The method of claim 5, wherein:

the data signal contains a code bit and a plurality of bits corresponding to bits of the second fixed point representation; and converting the data signal into the second fixed point representation further comprises:

checking the state of a bit which is in the register, wherein the address signal is independent of the bit checked;

modifying the plurality of bits in the data signal if the code bit indicates modification and the bit checked has a first value; and leaving the plurality of bits in the data signal unaltered if the bit checked has a second value.

9. The method of claim 6, wherein:

the data signal contains a code bit and a plurality of bits corresponding to bits of the second fixed point representation; and converting the data signal into the second fixed point representation further comprises:

checking the state of a bit which is in the register, wherein the address signal is independent of the bit checked; and modifying the plurality of bits in the data signal if the code bit indicates modification, and the bit checked has a first value, and leaving the the plurality of bits in the data signal unaltered if the bit checked has a second value.

10. The method of claim 1, wherein the first fixed point representation is an integer representation.

11. A digital circuit for accepting a signal representing a divisor and providing a signal representing a quotient of a fixed dividend and the divisor, the circuit comprising:

a register for storing a first fixed point representation of the divisor, the first fixed point representation containing a plurality bits including a most significant bit;

means, operably connected to the register, for converting bits of the first fixed point representation not including the most significant bit into an address signal;

a look-up table memory which, in response to the address signal, provides a data signal indicating a compressed representation of a quotient of the fixed dividend and a factor, wherein the divisor equals the product of the factor and a power of two; and a decompressor which converts the data signal into the signal representing the quotient of the fixed dividend and the divisor.

12. The digital circuit of claim 11, wherein the factor is a number between one and two.

13. The digital circuit of claim 11, wherein the means for converting comprises means for shifting the first fixed point representation of the divisor until the most significant bit of the first fixed point representation is shifted out of the register and into a carry bit.

14. The digital circuit of claim 13, wherein the decompressor further comprises:

means for converting the data signal from the look-up table memory to a second fixed point representation which represents the quotient of the dividend and the factor; and means for performing a logical shift on the second fixed point representation.

15. The digital circuit of claim 14, wherein:

the data signal provided by the look-up table memory is independent of a most significant bit of the second fixed point representation; and means for converting the data signal further comprises means for appending a most significant bit to the data signal.

16. The digital circuit of claim 15, wherein:

the data signal provided by the look-up table memory is independent of two most significant bits of the second fixed point representation; and means for converting the data signal comprises means for appending to the data signal a bit having a first value when the factor is less than a cut-off value and a second value when the factor is greater than the cut-off value.

17. The digital circuit of claim 14, wherein the data signal contains a code field which indicates whether a fixed point representation of a first quotient differs from a fixed point representation of a second quotient.

18. A method for using a digital circuit to determine a multiplicative inverse of a count, the method comprising the steps of:

storing a first fixed point representation of the count in a register, the first fixed point representation having a most significant non-zero bit;

shifting the first fixed point representation logically left in the register until the most significant non-zero bit of the first fixed point representation is shifted into a carry bit of the register;

counting logical left shifts to determine a number S of shifts required to shift the most significant non-zero bit of the first fixed point representation into the carry bit of the register;

applying, to a look-up table, an address signal indicating the most significant bits in the register and not in the carry bit, wherein, in response to the address signal, the look-up table provides a data signal corresponding to the address signal;

converting the data signal from the look-up table into a second fixed point representation; and performing one or more logical shifts right on the second fixed point representation to provide a third fixed point representation indicating the multiplicative inverse of the count, wherein the number logical shifts right depends on number S.

19. The method of claim 18, wherein the first fixed point representation is an integer representation.

* * * * *